S. RESEK.
WATER COCK.
APPLICATION FILED DEC. 21, 1908.
952,048.
Patented Mar. 15, 1910.
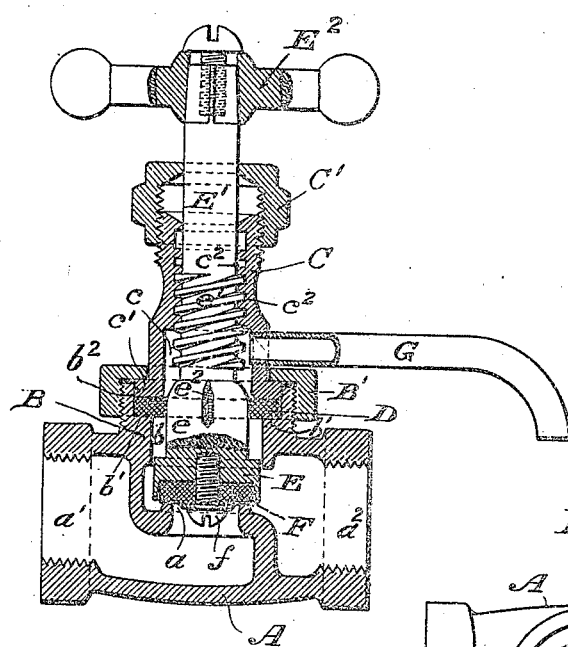
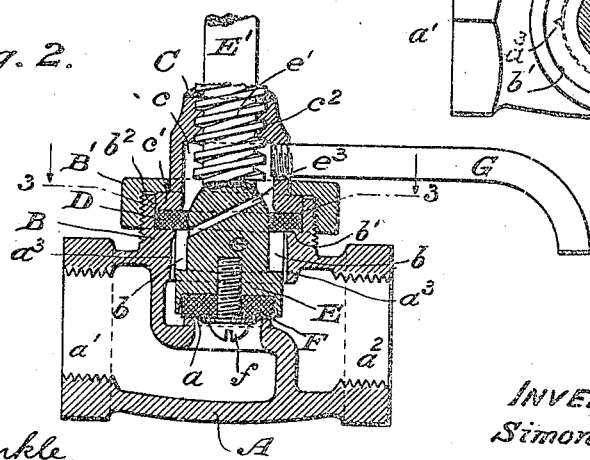
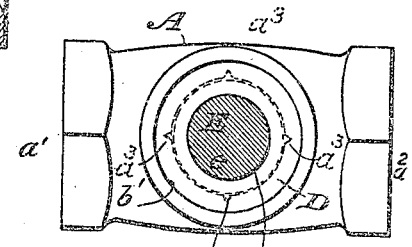
WITNESSES:
Arthur C. Skinkle.
John G. Riddle.
INVENTOR:
Simon Resek.
by his attorney
Wm. A. Skinkle

UNITED STATES PATENT OFFICE.

SIMON RESEK, OF CLEVELAND, OHIO.

WATER-COCK.

952,048. Specification of Letters Patent. Patented Mar. 15, 1910.

Application filed December 21, 1908. Serial No. 468,427.

*To all whom it may concern:*

Be it known that I, SIMON RESEK, a citizen of the United States, residing in Cleveland, county of Cuyahoga, and State of Ohio, have invented certain new and useful Improvements in Water-Cocks, of which the following is a specification, that will enable those skilled in the art to which the invention pertains to make and use the same, reference being had to the accompanying drawing, which forms a part hereof.

This invention relates to a valve adapted to close and control the supply at one side and, when closed, to drain off the pipe on the other side; and it consists of certain novel features and combinations of features as will hereinafter, be described.

The accompanying drawing shows the invention in its now preferred form.

Figure 1, is a vertical longitudinal section of a valve embodying the preferred features of the invention. Fig. 2, is a similar section, showing modifications of some of the features. Fig. 3, is a horizontal section on the line 3, 3 of Fig. 2.

The valve body A is provided with the usual seat $a$ and with a supply opening, $a'$, on the pressure side, and a delivery opening $a^2$ on the other side; both openings suitably tapped for pipe connections. Above and in axial line with the valve seat is formed an extension B, cylindrically bored to form a chamber $b$, offset to form an annular shoulder $b'$ and above it bored as at $b^2$ larger than the chamber $b$. The upper end of this extension is screw threaded on its exterior to receive a clamping ring B'. A screw cap C having an annular flange $c'$ is adapted to rest upon the seat or shoulder $b'$ in the extension, and be rigidly clamped thereon by the ring B' which engages the flange $c'$ for this purpose. A washer D of fiber, rubber or other suitable material, is interposed between the seat $b'$ and the flange $c'$ for a purpose to be explained later. The cap is bored to form a waste chamber $c$, above which it is internally threaded as at $c^2$ for the reception of the valve stem, and at its top is threaded on its exterior end to receive a gland nut C'.

A valve block E is preferably cast integral with its stem E' and it is recessed on its lower face to receive a washer F of fiber, rubber or other suitable material, which is held in its recess by the screw $f$. The lower head of the valve block is finished to fit loosely in the chamber $b$, into which it extends, the fit being sufficiently loose to admit of the leaking through of water when draining but not enough to permit the rapid flow of a large volume. Just above this head the diameter of the block is reduced as at $e$ which reduced portion fits very snugly in the washer D and may be rounded off at its upper end as shown. The valve stem E' which extends above this reduced portion $e$ is formed with screw threads $e'$ to engage the threaded portion of the cap, and it is provided with the usual cross handle E$^2$ at its top.

A drain spout G is screwed into the wall of and communicates with the waste chamber $c$, and as the cap C is held by the clamping pressure of the ring B', it may be turned to point this drain spout in any desired direction. The spout is placed in position after the clamping ring B' is in place.

A groove $e^2$ is formed in the surface of the reduced portion $e$ of the valve block at its upper end, this groove extending beyond the washer D at both its sides, when the valve is closed on its seat, and thereby opens communication between the chambers $b$ and $c$ and permits the draining water to pass from one to the other and out at the drain spout G. When the valve is opened this groove is raised so that its lower end is out of communication with the lower chamber $b$ and thus cuts off the drain passage and prevents the escape of any water while the pressure is on the delivery side of the valve. Only one drain groove $e^2$ is shown but several may be made if found desirable. As a modification of this form there is shown in Fig. 2 a drain hole $e^3$ drilled diagonally across the valve body so that its entrance is below the washer while its discharge end is above it, as shown, the lower end lying so close beneath the washer that the first movement in opening the valve will raise the entrance above the lower plane of the washer and cut off the drain.

The valve head, as before explained, is loosely fitted into the chamber $b$ and the leakage around it is depended upon to drain the discharge side of the valve. The space between the head and the wall of the chamber is quite small in order to limit the flow, and it might, under some conditions, become clogged with mud or sediment. To overcome this one or more deeper notches $a^3$ may be cut in the wall of the chamber, their greater area having less tendency to clog than the exceedingly fine annular space around the valve head before described.

A valve constructed in accordance herewith is simple and economical to make and may be easily adjusted to suit any condition likely to be encountered in its application.

Having thus described the invention what is claimed as new and useful and desired to secure by Letters Patent is:

In a water cock, the combination of a valve body having the usual through passage with right angled valve seat therein, an extension formed on said valve body with a lower chamber bore, a seat or shoulder and a larger bore above it, a screw cap C having an annular flange at its base seated in said larger bore of the extension, a clamping ring engaging said annular flange and screwing upon the extension, a waste chamber formed in the lower end of the cap, an annular washer clamped between the shoulder of the extension and the annular flange of the cap and separating the waste chamber of the cap from the chambered bore of the valve body, a valve screw in the cap, a screwed valve stem, a valve head on the bottom of the stem adapted to loosely fit the chambered bore of the valve body, a reduced portion of the valve block immediately above the head extending through and snugly fitting the washer, a passage along said reduced portion having its respective ends immediately below and above said washer, with an outside drain spout leading from the waste chamber in the cap, all arranged and adapted to operate substantially as and for the purpose herein set forth.

In testimony whereof I have signed my name to this specification in the presence of two subscribing witnesses.

SIMON RESEK.

Witnesses:
  J. C. MANOBARGER,
  WILLIAM E. KRUPP.